United States Patent [19]

Sandiford et al.

[11] Patent Number: 4,673,038

[45] Date of Patent: Jun. 16, 1987

[54] GEL AND PROCESS FOR PREVENTING CARBON DIOXIDE BREAK THROUGH

[75] Inventors: Burton B. Sandiford, Balboa Island, Calif.; Roger C. Zillmer, Bloomington, Minn.

[73] Assignee: Cities Service Oil and Gas Corporation, Tulsa, Okla.

[21] Appl. No.: 822,120

[22] Filed: Jan. 24, 1986

Related U.S. Application Data

[63] Continuation-in-part of Ser. No. 623,917, Jun. 25, 1984, abandoned.

[51] Int. Cl.$^4$ .......................................... E21B 33/138
[52] U.S. Cl. .................................. 166/270; 166/273; 166/294; 166/295; 523/130
[58] Field of Search ............... 166/270, 273, 274, 275, 166/294, 295, 300; 523/130

[56] References Cited

U.S. PATENT DOCUMENTS

| | | | |
|---|---|---|---|
| Re. 30,767 | 10/1984 | Felber et al. | 166/261 |
| Re. 31,748 | 11/1984 | Block | 252/8.5 A |
| 2,249,538 | 7/1941 | McDowell et al. | 252/316 |
| 2,311,059 | 2/1943 | Lowe | 95/7 |
| 2,623,596 | 12/1952 | Whorton et al. | 166/274 |
| 2,720,501 | 10/1955 | Van Ness | 525/61 |
| 2,832,414 | 4/1958 | Battle | |
| 2,864,448 | 12/1958 | Bond et al. | |
| 2,875,831 | 3/1959 | Martin et al. | 166/274 X |
| 3,079,337 | 2/1963 | Turbak et al. | |
| 3,080,207 | 3/1963 | Tanabe | 8/115.5 |
| 3,207,217 | 9/1965 | Woertz | 166/273 |
| 3,251,795 | 5/1966 | Fukushima et al. | 524/557 |
| 3,265,536 | 8/1966 | Miller et al. | |
| 3,265,657 | 8/1966 | Sinclair | |
| 3,285,338 | 11/1966 | Boston | 166/270 |
| 3,396,790 | 8/1968 | Eaton | |
| 3,421,584 | 1/1969 | Eilers et al. | |
| 3,452,817 | 7/1969 | Fallgatter | 166/305 R |
| 3,554,287 | 1/1971 | Eilers et al. | 166/295 |
| 3,640,734 | 2/1972 | Oppenheimer et al. | 99/176 |
| 3,658,745 | 4/1972 | Merrill et al. | |
| 3,663,470 | 5/1972 | Nishimura et al. | 260/2.5 F |
| 3,741,307 | 3/1973 | Sandiford et al. | 166/273 |
| 3,749,172 | 7/1973 | Hessert et al. | 166/274 |
| 3,757,863 | 9/1973 | Clampitt et al. | 166/270 X |
| 3,762,476 | 10/1973 | Gall | 166/294 |
| 3,782,467 | 1/1974 | Hessert | 166/295 X |
| 3,785,437 | 1/1974 | Clampitt et al. | 166/281 |
| 3,794,115 | 2/1974 | Skagerberg | 166/294 |
| 3,795,276 | 3/1974 | Eilers et al. | 166/295 |
| 3,859,269 | 1/1975 | Maurer | |
| 3,875,074 | 4/1975 | Vassiliades et al. | 252/316 |
| 3,912,529 | 2/1985 | Kotani et al. | 106/187 |
| 3,926,918 | 12/1975 | Shibata et al. | 260/73 L |
| 3,941,730 | 3/1976 | Solenberger | |
| 4,015,995 | 4/1977 | Hess | 166/295 X |
| 4,018,286 | 4/1977 | Gall et al. | 166/295 |
| 4,039,029 | 8/1977 | Gall | 166/294 |
| 4,040,258 | 8/1977 | Argabright et al. | 166/295 X |
| 4,098,337 | 7/1978 | Argabright et al. | 166/270 |
| 4,154,912 | 5/1979 | Phillips et al. | |
| 4,262,067 | 4/1981 | Phillips et al. | |
| 4,272,470 | 6/1981 | Hsu et al. | 264/104 |
| 4,336,145 | 6/1982 | Briscoe | 252/8.55 R |
| 4,349,443 | 9/1982 | Block | 252/8.5 A |
| 4,353,804 | 10/1982 | Green et al. | 252/8.5 A |
| 4,376,183 | 3/1983 | Haskell | 524/417 |
| 4,385,155 | 5/1983 | Michaels | 525/61 |
| 4,389,319 | 6/1983 | Block et al. | 252/8.5 A |
| 4,411,800 | 10/1983 | Green et al. | 252/8.5 A |
| 4,424,302 | 1/1984 | Block et al. | 525/58 |
| 4,428,429 | 1/1984 | Felber et al. | 166/294 |
| 4,428,845 | 1/1984 | Block | 525/58 |
| 4,447,341 | 5/1984 | Block | 252/8.5 A |
| 4,472,552 | 9/1984 | Blouin | 525/61 |
| 4,473,480 | 9/1984 | Green et al. | 252/8.5 A |
| 4,485,875 | 12/1984 | Falk | 166/295 |
| 4,486,318 | 12/1984 | Green et al. | 252/8.5 A |
| 4,498,540 | 2/1985 | Marrocco | 166/295 |
| 4,569,393 | 2/1986 | Bruning et al. | 523/130 X |

FOREIGN PATENT DOCUMENTS

| | | |
|---|---|---|
| 950355 | 7/1974 | Canada . |
| 356408 | 9/1931 | United Kingdom . |
| 2073228 | 10/1981 | United Kingdom . |
| 2074636A | 11/1981 | United Kingdom . |

OTHER PUBLICATIONS

Journal of Colloid & Interface Science, vol. 90, No. 1, Nov. 1982, pp. 34–43.
Journal of the Electrochemical Society, vol. 130, No. 2, Feb. 1983, pp. 255–259.
U.S. Government Doc. N81-29531 (NASA Case No. LEW-13, 102-1).

Primary Examiner—George A. Suchfield
Attorney, Agent, or Firm—F. Eugene Logan

[57] ABSTRACT

A gel-forming composition is provided comprising a first substance selected from the group consisting of a polyvinyl alcohols, polyvinyl alcohol copolymers, and mixtures thereof, a second substance selected from the group consisting of aldehydes, aldehyde generating substances, acetals, acetal generating substances, and mixtures thereof capable of crosslinking with the first substance through the formation of acetal crosslinkages, and water, and which requires contacting with a sorbed substance or brine which has sorbed substantial amounts of carbon dioxide before the gel-forming composition will form a gel. The gel-forming composition is useful for retarding the flow of carbon dioxide and other fluids in subterranean formations. For example, a method is provided for preventing the loss of carbon dioxide to nonproductive parts of an oil reservoir. Such method is particularly useful in carbon dioxide flood operations to increase the sweep efficiency of the oil recovery process and in cyclic carbon dioxide injection operations for increasing the fluidity of the reservoir oil.

4 Claims, No Drawings

GEL AND PROCESS FOR PREVENTING CARBON DIOXIDE BREAK THROUGH

RELATED APPLICATIONS

This application is a continuation-in-part application of serial number 623,917 filed June 25, 1984, now abandoned, which is incorporated herein by reference.

The subject matter of this application is related to that of commonly assigned U.S. Pat. No. 4,498,540 for "Gel for Retarding Water Flow" which is hereby incorporated herein by reference.

TECHNICAL FIELD

This invention relates to gel, methods of forming gel, and uses for gels. A polyvinyl alcohol based-aldehyde hydrogel, or gel, is provided which is useful for immobilizing large volumes of earth. The gel can be used for reducing the permeability of soils and subterranean formations to the flow of carbon dioxide and other fluids, including waters or brine. The gels of this invention are particularly valuable in retarding the flow and loss of carbon dioxide in hydrocarbon production from a wellbore.

BACKGROUND OF THE INVENTION

The recovery of hydrocarbons, especially oil, frequently involves the injection of fluids into the reservoir to either force or drive the hydrocarbons from one location to another, as in flooding operations, or even more basically stated, to improve the flow of the hydrocarbons to the production well as in various stimulation operations. Carbon dioxide and other fluids, including water and steam, are frequently injected for such purposes, particularly for the recovery of oil.

A discussion of the problems encountered with the use of injected carbon dioxide is presented in an article entitled Reservoir Application of Mobility Control Foams in $CO_2$ Floods, of the Society of Petroleum Engineers/U.S. Department of Energy paper SPE/DOE 12644, pp 159 to 167. Foams and surfactants are frequently used for retarding the formation of viscous fingers durng carbon dioxide floods.

A known method of reducing the flow of water is described in U.S. Pat. No. 3,762,476 wherein a first aqueous polymer solution selected from the group consisting of polyacrylamide, a partially hydrolyzed polyacrylamide, a polysaccharide, a carboxymethylcellulose, a polyvinyl alcohol, and polystyrene sulfonate, is injected into a subterranean formation. Thereafter, a complexing ionic solution of multivalent cations and retarding anions, and which also comprises aluminum citrate, is injected into the subterranean formation. The multivalent cations are selected from the group consisting of $Fe(II)$, $Fe(III)$, $Al(III)$, $Ti(IV)$, $Zn(II)$, $Sn(IV)$, $Ca(II)$, $Mg(II)$, $Cr(III)$, and the retarding anions are selected from the group consisting of acetate, nitrilotriacetate, tartrate, citrate, phosphate. Brine is then injected followed by a second slug of an aqueous polymer solution which can be the same or different from the first aqueous polymer solution. In any event, the complexing ionic solution of multivalent cations and retarding anions is capable of gelling both the first and second aqueous polymer solution.

Water produced from a wellbore can come from the infiltration of naturally occuring subterranean water as described above, or the water can come from injected water put into the formation in those hydrocarbon recovery processes which utilize waterflooding. U.S. Pat. No. 4,098,337 discloses a method for forming a hydroxymethylated polyacrylamide gel, in situ, to reduce the permeability of a thusly treated zone where the waterflood method of oil recovery is employed. In this case the gel was formed in situ by the injection of an aqueous polyacrylamide solution and an aqueous formaldehyde solution.

Although polyacrylamide-based gels can be effective in retarding water production or flow in some subterranean formations, polyacrylamide-based gels will not be stable or effective in all formations. In general, polyacrylamide-based gels will work satisfactorily in formations having a temperature below about 65° C. Above about 65° C., polyacrylamide-based gels become very sensitive to hardness of the brines, especially where hardness is above about 1000 ppm. The hardness of the water becomes a more detrimental factor the higher the temperature, thus for very hot regions even low hardness levels can render many gels ineffective. Formations which have a higher temperature, hardness, or total dissolved solids content above the aforementioned ranges usually are not capable of being succesfully treated with polyacrylamide-based polymers except for a relatively short period of time.

In many hydrocarbon producing wells temperatures of 80° C. or higher are often encountered. Formation waters frequently have hardnesses which exceed 1000 ppm. It is therefore desirable to develop a gel which can be used to retard or block the flow of water in subterranean formations having a temperature of 65° C. or higher, and a water hardness of 1000 ppm or higher.

In other flooding operaions, rather than water, other fluids can be used. Some fluids which are frequently used are carbon dioxide and steam. Carbon dioxide is also used in other treating methods such as "Push and Pull" operations, sometimes referred to as "cyclic carbon dioxide injection" or "Huff and Puff" operations, where a production well is injected with carbon dioxide for several days and then produced for a month or so result in channels being formed which if not blocked will result is an inefficient carbon dioxide treating operation due to loss of the gas into channels which drain into nonproductive parts of the reservoir. Because many of the existing gels degrade rapidly at elevated temperatures, polymers such as polyacrylamides are generally not satisfactory. Other fluids such as steam can also be used in push and pull operations.

Flooding operations using carbon dioxide as the drive fluid frequently experience a loss of drive fluid to nonproductive parts of the reservoir because of greater ability of the gas to dissipate into such channels as opposed to liquids. Loss of drive gases in carbon dioxide flooding operations and carbon dioxide in $CO_2$ stimulation methods is more difficult to prevent because the flow channels responsible for such losses can be very small in diameter or width thereby making it very difficult to fill such channels with a blocking agent. Some viscous plugging substances, even though they may have the desired stability at higher temperatures, are not able to penetrate and effectively fill narrow channels, particularly as such channels become more distant from the wellbore.

Thus there is a need for plugging agents which can be formulated to penetrate deeply into the formation. The use of this invention addresses this problem and provides polyvinyl alcohol based gels which can be tailor made to the particular problem at hand and which can overcome many of the shortcomings of prior art plugging agents and gels.

Polyvinyl alcohol gels have been used to protect well casings from corrosion. U.S. Pat. No. 2,832,414 discloses such a method wherein an aqueous solution of a water soluble polyvinyl alcohol which is capable of forming a gel if maintained in a quiescent state, is pumped into the annular space between the casing and the wall of the bore hole. After allowing the polymer to remain quiescent over a period of time a gel is formed. The thusly formed gel preventsthe intrusion of formation water into the annular space thereby reducing corrosion of the metal casing. Apparently, no crosslinking agent is employed and for that reason is not believed that this particular gel would be useful for plugging channels or fractures on a permanent bases. Furthermore, in U.S. Pat. No. 2,832,414 the gel is used to fill a relatively large but stagnant cavity compared to the volume of a typical channel in a subterranean formation associated with loss of carbon dioxide.

Studies of the macroscopic changes in polyvinyl acetate gels that occur upon removal from swelling equilibrium with isopropyl alcohol were reported in the Journal of Colloid and Interface Science, Vol. 90, No. 1, November 1982, pages 34 to 43. These studies were conducted using films of gels having various degrees of crosslinking and polymer concentration. The polyvinyl acetate gels were formed from precursor polyvinyl alcohol gels that were crosslinked with glutaric dialdehyde which were then converted to acetate gels by polymer homologous acetylation.

U.S. Pat. No. 3,265,657 discloses a process for preparing an aqueous polyvinyl alcohol composition, which remains fluid for at least a few seconds after preparation and spontaneously gels thereafter. The gel is formed by contacting a gelable fluid aqueous polyvinyl alcohol solution with a hexavalent chromium compound and a reductive agent to convert Cr (VI) to Cr (III). The compositions are used to produce foams suitable as insulating, acoustical, and packaging materials. The gels are crosslinked with chromium, not an aldehyde.

U.S. Pat. No. 3,658,745 discloses a hydrogel which is capable of significant expansion upon cooling in water and reversible shrinking upon heating which comprises a crosslinked acetalated hydrogel formed by reacting a polyvinyl alcohol previously dissolved in water and a monaldehyde and dialdehyde. The hydrogels are alleged to have sufficient crosslinking to prevent inhibition of macromolecular materials such as proteins but not the imbibition of micromolecular materials such as low molecular weight water solutes. These hydrogels are alleged to be useful for dialytic purification when pure water is added to the macromolecular solution after each cycle. Apparently these particular hydrogels are able to absorb and desorb water and microsolutes with alternate cooling and heating cycles. Apparently a major amount of shrinkage of these gels occurs upon slight heating such as from 12° to 37° C. which indicates that these gels would have little value for blocking carbon dioxide and other fluids, including water, in subterranean formations, especially at temperatures of 37° C. or higher.

SUMMARY OF THE INVENTION

By the term "aldehyde" as used herein is meant a monoaldehyde, a dialdehyde, a polyaldehyde, and any of the former whether substituted or unsubstituted. Preferably the aldehyde contains two functional groups such as dialdehyde or a substituted monoaldehyde as used herein is meant to include unsaturated carbon-carbon bond as well as substitution of functional groups. Nonlimiting examples of substituted monoaldehyde are acrolein and acrolein dimethylacetal. Polyaldehydes can be used and may in some cases be more desirable, however, polyaldehydes are not as available commercially as dialdehydes and as a consequence use of polyaldehydes may not be practical.

Non-limiting examples of dialdehyde crosslinking agents are glyoxal, malonaldehyde, succinaldehye, glutaraldehyde, adipaldehyde, terephthaldehyde. Non-limiting examples of dialdehyde derivatives are glyoxal bisulfite addition compound

glyoxal trimeric dihydrate, malonaldehyde bisdimethylacetal, 2,5-dimethoxytetrahydrofuran, 3,4-dihydro-2-methoxy-2H-pyran, and furfural. Acetals, hemiacetals, cyclic acetals, bisulfite addition compounds, shiff's bases or other compounds which generate dialdehydes in water, either alone or in response to an additional agent such as an acid or a condition such as heat are also meant to be included in the term "aldehyde" as used and claimed herein.

Non-limiting examples of monoaldehyde with a second functional group in addition to the aldehyde group are acrolein and acrolein dimethylacetal.

Non-limiting examples of polyaldehydes are polyacrolein dimethylacetal, addition products of acrolein for example, ethylene glycol plus acrolein, and glycerol plus acrolein.

By the term "acidic catalyst" or "crosslinking catalyzing substance" as used herein is meant a substance which is a proton donor or a substance which in its environment will form or become a proton donor. All acids are operable as an acidic catalyst in the gel systems described herein, for example, Bronsted acids such as mineral and carboxylic acids, or Lewis acids. Non-limiting examples of a Lewis acid are zinc chloride, ferrous chloride, stannous chloride, aluminum chloride, barium fluoride, and sulfur trioxide. Some of these chemicals hydrolyse in water to produce metal oxides or hydroxides and HCl or HF. The rate of hydrolysis of many Lewis acids is dependent on temperature and the other dissolved compounds in the solution. The rate of production of the acidic catalyst, HCl, from some of the above Lewis acids determines the rate of gel formation.

A delayed action catalyst is a substance which is not acidic in and of itself, but which generates an acidic catalyst slowly on interaction with water at the temperature of interest. For example, the rate of generation of the acid in oil well usage is usually controlled by the reservoir temperature experienced during the in-situ gel formation. In many applications the rate of acidic catalyst generation or release can be controlled by the gel-forming fluid formulation to range from a few minutes to a few days or more.

The acid catalyst can be a two component system, for example, a two component delayed action catalyst can comprise a first component which will react with a second component, to form an acidic catalyst. A non-limiting example of such a two component delayed action catalyst is sodium persulfate and a reducing agent. In such a delayed catalyst system the sodium persulfate reacts with the reducing agent to produce sulfuric acid. In another two component delayed action catalyst system the reaction product of the two components can react with water to form the acidic catalyst.

The acidic catalyst and/or delayed action catalyst must, of course, have some solubility in water. However, in some oil field usages the partial solubility of the acidic catalyst in the oil product can be advantageous if treatment is to include subterranean zones containing both oil and water. The fraction of the acidic catalyst or delayed action catalyst which dissolutes in oil will, of course, not be available to catalyze the gel formation reaction in such zones of high oil content; consequently such oil-water zones will not be blocked by gel formation to the same extent as those zones with little or no oil present.

Non-limiting examples of delayed action catalysts are methyl formate, ethyl formate, methyl acetate, ethyl acetate, glycerol monoacetate or acetin and glycerol diacetate or diacetin.

Laboratory tests conducted on core samples have shown that diacetin hydrolysis more slowly than methyl formate at all temperatures including the higher temperatures. Therefore, where subterranean formations having higher temperatures are encountered, diacetin or acetin because of their slower rate of hydrolysis are used to provide a longer time for crosslinking reactions to occur and hence provide a longer time for the gelling forming fluids to penetrate into the pores of such subterranean zones before gelation occurs. Non-limiting examples of delayed action catalyst and their acidic catalyst product are:

| Delayed Action Catalyst | Acidic Catalyst Product |
|---|---|
| Methyl formate | Formic acid |
| Glycerol diacetate | Acetic acid |
| Sodium persulfate | Sulfuric acid |
| Sodium dodecyl sulfate | Sulfuric acid |
| Methyl methane sulfonate | Methylsulfonic acid |
| Sodium triiodide/sodium bisulfate/water | Hydroiodic acid |

Therefore, delayed action acidic catalysts can be esters which slowly hydrolyze in water, the rate of hydrolysis being dependent on temperature and initial pH. Other delayed action catalysts are the analogs of esters and acids such as sulfones, xanthates, xanthic acids, thiocyanates, and the like. In some of these examples, hydrolysis produces an acidic catalyst which speeds the crosslinking reaction and an alcohol which does not affect gel formation. An example of a delayed action acidic catalyst is methyl formate which is influenced by the environment with respect to the rate of formation of acid. For example, the higher the temperature, the faster methyl formate will hydrolyze and generate formic acid.

By the term "Bronsted acid" as used herein is meant a chemical which can act as a source of protons. By the term "Lewis acid" as used herein is meant a chemical that can accept an electron pair from a base. By the term "delayed action acid" as used herein is meant any acidic catalyst which makes available or generates donor proton over a period of time or after an initial period of time either as a consequence of its characteristic or the characteristics of the environment in which it is used.

By the term "gel" as used herein is meant a chemically crosslinked three-dimensional elastic network of long-chain molecules with a certain amount of immobilized solvent (diluent) molecules.

By the term "PVA based substance" or "PVA" (frequently referred to herein as the "first substance") as used herein is meant long-chain molecules selected from the group consisting of polyvinyl alcohols, polyvinyl alcohol copolymers, and mixtures thereof.

By the term "PVA-aldehyde gel" as used herein is meant a chemically crosslinked three-dimensional elastic network of long-chain molecules selected from the group consisting of a polyvinyl alcohol, a polyvinyl alcohol copolymer, and mixtures thereof, crosslinked with an aldehyde, and containing a certain amount of immobilized and chemically bound water molecules.

By the term "PVA-glutaraldehyde gels" as used herein is meant a chemically three-dimensional elastic network of various PVA based substances crosslinked with glutaraldehyde, and containing a certain amount of immobilized and chemically bound water molecules.

By the term "water" as used herein, unless otherwise specified, is meant to include any source of water, including brine, sea water, brackish water, formation water, fresh water and pure water which is $H_2O$. Furthermore if the water is a brine, the brine can be saturated at an elevated temperature. By the term "aqueous" as used herein, unless otherwise specified, is meant to include aqueous solutions comprising such water. Thus, for example, an aqueous solution of the first substance is to be understood to include the first substance dissolved in brine or fresh water.

All of the above mentioned acidic catalysts are effective crosslinking catalyzing substances for PVA-aldehyde gel systems.

Non-limiting examples of polyvinyl alcohol copolymers are polyvinyl alcohol-co-crotonic acid, polyvinyl alcohol-co-acrylic acid, polyvinyl alcohol-co-methacrylic acid, polyvinyl alcohol-co-vinylpyridine, and polyvinyl alcohol-co-vinylacetate, the latter of which is frequently present in small amounts in commercial grade polyvinyl alcohols.

By the expression "carbon dioxide break through fingers" or "non-productive high permeable flow channels" as used herein is meant nonproductive reservoir channels having high permeability to the flow of carbon dioxide and/or formation brines. In general, the fingers permit the carbon dioxide to be channeled into nonproductive areas of the reservoir thereby substantially lowering the efficiency of the carbon dioxide injection operation. Such fingers frequently contain substantial amounts of sorbed or absorbed carbon dioxide.

Accordingly, there is provided a process for retarding the flow of carbon dioxide-containing substance selected from the group consisting of carbon dioxide, gases containing carbon dioxide, carbonic acid, and mixtures thereof, in carbon dioxide break-through fingers in a subterranean formation, the process comprising, introducing a gas selected from the group consisting of carbon dioxide and gases containing carbon dioxide into a subterranean deposit containing nonproductive high gas permeable flow channels or carbon dioxide break-through fingers for a period of time sufficient for the flow channels to sorb a predetermined amount of the gas thereby forming a "sorbed substance" which can form or desorb and produce an acidic substance selected from the group consisting of carbon dioxide, carbonic acid, and mixtures thereof. The expression "sorbed substance" is meant to include all sorbing substance adjacent or proximate to the flow channels, including the wall or matrix material forming the boundaries of the flow channels, as well as any material in the flow channel, for example a brine, which is capable of sorbing the gas, i.e. carbon dioxide. The sorbed substance forms or produces the acidic substance either directly as in the case of a brine absorbing the carbon dioxide which then mixes with the gel-forming composition in the flow channels or by desorption of the matrix material proximate to the flow channels of the sorbed carbon dioxide containing substance and the absorption thereof by the gel-forming composition in the flow channels. The expression sorbed substance includes all the material proximate to the flow channels which has sorbed carbon dioxide and is capable of producing an acidic substance such as carbon dioxide or carbonic acid from the sorbed substances or is an acidic substance itself. Sorbed substances therefore include brine in or on the flow channels which has become acidic by virtue of the carbon dioxide gas. After the flow channels have sorbed a predetermined amount of the gas, the flow of the gas into the subterranean formation is stopped. After stopping the flow of said gas into said subterranean formation, and before the sorbed substance is desorbed, the process further comprises introducing an effective amount of a gel-forming composition into the subterranean formation. The gel-forming composition is operable, when contacting carbon dioxide break-through fingers containing the sorbed substance or brine which has absorbed substantial amounts of carbon dioxide, to form a gel in said fingers which is operable for retarding the flow of said carbon dioxide-containing substance in the fingers.

The gel-forming composition comprises
i. an aqueous solution comprising a PVA based substance or first substance selected from the group consisting of polyvinyl alcohols, polyvinyl alcohol copolymers, and mixtures thereof, and
ii. an amount of a second substance selected from the group consisting of aldehydes, aldehyde generating substances, acetals, acetal generating substances, and mixtures thereof capable of crosslinking with the first substance through the formation of acetal crosslinkages, which is operable for effecting gelation of the gel-forming composition in the fingers after contacting the gel-forming composition with a sorbed substance or brine which has sorbed substantial amounts of carbon dioxide, but which is inoperable for effecting gelation of the gel-forming composition in flow passages containing brine or other substance which has not sorbed or absorbed substantial amounts of carbon dioxide, or which is free of effective amounts of other crosslinking catalyzing substances. Before contacting the gel-forming composition with the sorbed substance or brine containing substantial amount of absorbed carbon dioxide, the gel-forming composition is substantially free of effective amounts of other crosslinking catalyzing substances which are operable for promoting substantial crosslinking reactions between the first substance and the second substance or aldehyde sufficient to form a gel. The process further comprises allowing the gel-forming composition to contact the sorbed substance or brine containing substantial amounts of sorbed carbon dioxide and to form a gel in the fingers of the subterranean formation which is effective for retarding the flow of said carbon dioxide-containing substance in the fingers. The gel-forming composition is formulated so that it will gel when reaching a predetermined pH value which is achieved in the nonproductive high permeable flow channels but which is not achieved in the more desirable and less permeable flow passages. Concurrent with the gelation at the predetermined pH value is the ability to formulate the gel so that it will also gel within a predetermined period of time. By controlling both the initial pH of the gel-forming mixture and the gel time in the nonproductive flow channels a high degree of selectivity as to which zones in the subterranean formation are to be plugged is possible. For example the gel-forming composition and the amount of carbon dioxide sorbed by the nonproductive flow channels and therefore the amount of acidic substance, i.e. carbonated brine or carbon dioxide, formed or generated by such sorbed substance can be designed so that the gel-forming composition will gel at a predetermined pH value of between about 3 to about 6 and in a period of time from about 15 minutes to about 5 days after the gel-forming composition is in the nonproductive flow channels. Preferably the predetermined pH value is from about 3.5 to about 5.5 and the gelation occurs from about 1 hour to about 4 days after the gel-forming composition enters the flow channels. Especially preferable parameters are where the predetermined pH value is from about 4 or 4.5 to 5 and gelation occurs in a period of time from about 2 hours to about 3 days. In yet other preferred embodiments the predetermined pH values for the onset of gelation are from about 3.5 to about 4.5, or from about 4.5 to about 5.5. Gel-forming compositions which have a pH higher than the predetermined pH value for the particular formulation will either not gel or if they do gel will not gel within the period of time required. By having the sorbed substance or brine containing the sorbed carbon dioxide proximate to, and in an effective amount at, the nonproductive flow channels the gel-forming composition will be able to penetrate the subterranean formation in depth and thereafter be acidified to the predetermined pH value by the acidic substance formed from the sorbed substance proximate to the nonproductive flow channels. Whereas the productive or desirable flow passages being less permeable are not able to produce enough acidic substance to be operable for forming a gel or if they are capable of forming a gel will not form the gel within the required period of time. After the gel is formed in the nonproductive flow channels, the subterranean formation is flooded or swept with a medium, preferably water, to remove or dilute any gel-forming composition remaining in the formation which has not gelled so that the desirable flow passages do not lose permeability.

In one embodiment the second substance or aldehyde is glutaraldehyde. In another embodiment the amount of second substance or aldehyde is from about 0.01 to about 2 percent, preferably from about 0.03 to about 1 percent of the weight of the gel-forming composition or gel. In another embodiment, the amount of second substance or aldehyde is at least about 2% of the stoichiometric amount required to react with all of the crosslinkable sites of the first substance. In still another embodiment the amount of the second substance or aldehyde is not sufficient to cause substantially complete gelation of the gel-forming composition while the acidity of the gel-forming composition is higher than a pH of about 6. In yet another embodiment, the amount of second substance or aldehyde is not sufficient to cause substantially complete gelation of the gel-forming composition while the acidity of the gel-forming composition is higher than a pH of about 5. In one embodiment the total aldehyde content of the gel-forming composition is from about 0.01 to about 2% of the weight of the gel-forming composition or thusly formed gel. In yet another embodiment the maximum amount of first substance plus second substance in the gel-forming composition is about 7%, preferably about 5%, and especially preferably about 3.5% by weight.

In another embodiment the amount of the first substance or PVA based substance is from about 0.5 to about 5%, preferably from about 1 to about 4%, and especially preferably from about 1.5 or 2 to about 3% of the weight of the gel-forming composition or gel. In a preferred embodiment the amount of the first substance is about 2.5% of the gel-forming composition or gel and the aldehyde is glutaraldehyde which provides about 0.1% of the weight of the gel-forming composition or gel. In a further embodiment the subterranean formation in which the gel-forming composition is injected has an average formation temperature of at least about 65° C.

In still another embodiment the gel-forming composition or gel is at least about 65 weight percent water, i.e. pure water or $H_2O$. In yet another embodiment the gel-forming composition or gel is at least about 93 weight percent brine. In the embodiment where the water is a brine, the brine can be saturated with dissolved salt and be hot or near its boiling point. Some hot saturated brines near their boiling points can contain as much as about 30% by weight dissolved salt or as little as about 70% by weight $H_2O$. Exact amounts of dissolved salt will vary depending on the various species of salts involved and the extent of any supersaturation. For example a gel-forming composition which is 93% by weight brine, wherein the brine is saturated and has a $H_2O$ content of 70% by weight, will be about 65% by weight $H_2O$. Preferably the gel-forming composition or gel is at least about 95% by weight water and especially preferably at least about 96% by weight. In another embodiment the first substance has an average molecular weight of at least 30,000, preferably at least 100,000. Preferably the average molecular weight of the first substance or polyvinyl alcohol is from about 100,000 to about 1,000,000. Higher molecular weights can be used; however, the higher molecular weight the higher the viscosity of an aqueous solution of the first substance or polyvinyl alcohol. Average molecular weights for the first substance over 5,000,000 will probably form too viscous a solution to be useful. In one embodiment the average molecular weight of the first substance is about 125,000. Preferably the first substance is polyvinyl alcohol.

In still another embodiment, the process further comprises preventing the introduction into the subterranean formation of an effective amount of a crosslinking catalyzing substance under conditions which are operable for causing substantial mixing of the crosslinking catalyzing substance with the gel-forming composition, wherein the crosslinking catalyzing substance is not a brine which has absorbed carbon dioxide but is operable for promoting substantial crosslinking reactions between the first substance and the aldehyde.

This process which first sorbs an effective amount of carbon dioxide in the nonproductive flow channels and then introduces the gel-forming composition into the flow channels provides better plugging of the flow channels than processes in which the plugging agent is injected first and then the carbon dioxide gas is then injected for the following reasons. When the carbon dioxide gas is injected after the plugging agent, as soon as the carbon dioxide reaches the first quantity of plugging agent, the agent forms the plug thereby tending to prevent additional carbon dioxide from penetrating deeper into the flow channels and setting off or causing additional plugging of the deeper in place plugging agent. Thus the plugs which are formed tend to be near the wellbore and the plugging agent which is in place at greater distances from the wellbore is prevented from receiving an effective amount of carbon dioxide gas and therefore does not form an effective plug. Consequently the plugging achieved by first injecting the plugging agent and then the carbon dioxide is apt to be very close to the wellbore and as a consequence eventual short circuiting of gas around the relatively short plug is likely to occur shortly after the well is reactivated. In the process of this invention, the sorbed carbon dioxide is available at very great distances from the wellbore. Thus the crosslinking reaction in the gel-forming composition used in this invention will be catalyzed at every point in the flow channel in which the gel-forming composition is placed no matter how far distant the gel-forming composition is from the wellbore. Thus the nonproductive steam channels can be plugged over greater distances from the wellbore in this invention than where the plugging agent is injected first and the carbon dioxide gas last. Furthermore by injecting the carbon dioxide last there is a tendency to blow or force the plugging agent out of the flow channels so that the agent does not completely plug the flow channels, whereas in this invention since the gel-forming composition is injected after the carbon dioxide is injected, the gel-forming composition cannot be blown out of the nonproductive channels before it gels by injected carbon dioxide. Thus in one embodiment no additional carbon dioxide or other gas or drive fluid is allowed to be introduced into the formation until the gel is formed in the nonproductive flow channels in order to prevent disturbing the gel-forming composition as the gel is being formed. It is advantageous to let the gel-forming composition remain quiescent until the gel is completely formed in the nonproductive flow channels. After the gel has formed in the nonproductive flow channels, i.e. immediately after the predetermined period of time for the gel to set in the channels, the formation is purged with a substance, e.g. a brine, to remove or sweep out any gel-forming composition which has not gelled out of the less permeable and oil-bearing strata.

There is also provided a gel-forming composition comprising i. a first substance selected from a group consisting of polyvinyl alcohols, polyvinyl alcohol copolymers, and mixtures thereof, ii. water, and iii. an amount of a second substance selected from the group consisting of aldehydes, aldehyde generating substances, acetals, acetal generating substances, and mixtures thereof capable of crosslinking with the first substance through the formation of acetal crosslinkages, which is operable for forming a gel with the first substance and the water when the acidity of the gel-forming composition has a sufficiently low pH, but which is not operable for forming a gel when the pH is 6 or higher. The gel-forming composition is caused to have such sufficiently low pH by contacting it with an effective amount of a sorbed substance or reservoir brine having effective amounts of sorbed carbon dioxide sufficient for catalyzing, in the gel-forming composition, a crosslinking reaction between the first substance and the second substance or aldehyde, the gel-forming composition initially being free of effective amounts of other crosslinking catalyzing substances operable for promoting a crosslinking reaction in the gel-forming composition between the first substance and the second substance or aldehyde. In a further embodiment the aldehyde is glutaraldehyde. In another further embodiment the gel-forming composition will not form a gel when the acidity of the gel-forming composition has a pH of 5 or higher.

In yet another embodiment water, i.e. $H_2O$ is at least about 65 percent of the weight of the gel-forming composition. In still another embodiment the PVA based substance is from about 1.5 to 5 percent of the weight of the gel-forming composition. In yet another embodiment the second substance or aldehyde is from about 0.03 to about 2 percent of the weight of the gel-forming composition. In still another embodiment the water is provided by a brine, and the brine is at least about 93 percent of the weight of the gel-forming composition. In yet another embodiment the amount of the second substance or aldehyde is at least about 2 percent of the stoichiometric amount required to react with all of the crosslinkable sites of the first substance. In one embodiment the first substance is polyvinyl alcohol. In yet another embodiment, the first substance has an average molecular weight of at least 30,000. In a further embodiment the first substance has an average molecular weight of at least 100,000. Preferably the average molecular weight of the first substance or polyvinyl alcohol is from about 100,000 to about 1,000,000. Higher molecular weights can be used; however, the higher molecular weight the higher the viscosity of an aqueous solution of the first substance or polyvinyl alcohol. Average molecular weights for the first substance over 5,000,000 will probably form too viscous a solution to be useful. In one embodiment the average molecular weight of the first substance is about 125,000.

There is also provided a gel formed by reacting (a) a gel-forming composition comprising a first substance selected from the group consisting of polyvinyl alcohol, a polyvinyl alcohol copolymer, and mixtures thereof, water, and an amount of a second substance selected from the group consisting of aldehydes, aldehyde generating substances, acetals, acetal generating substances, and mixtures thereof capable of crosslinking with the first substance through the formation of acetal crosslinkages, which is operable for forming a gel with the first substance and the water when, the acidity of the gel-forming composition has a sufficiently low pH, but which is not operable for forming a gel when the pH is 6 or higher, with (b) an effective amount of water containing sorbed carbon dioxide sufficient to lower the acidity of the gel-forming composition to a pH less then about 6. In a further embodiment the first substance is polyvinyl alcohol having an average molecular weight of at least about 30,000. In yet another embodiment the aldehyde is glutaraldehyde. In yet another embodiment water, i.e. $H_2O$ is at least about 65 percent of the weight of the gel-forming composition used to form the gel or the gel so produced.

In general, the gel-forming composition is formulated so that it will not gel unless it is in contact with an acidic brine such as that occuring at carbon dioxide break-through points in the subterranean formation. In a further embodiment the gel-forming composition will not gel except in channels containing a sorbed substance or brine having a pH below about 6. Preferably the gel forming composition is formulated so that it will not gel in brines having a pH of about 5 or higher. h These gel formations, therefore, are designed so that they will not gel in flow channels containing brines of higher acidic pH's or basic pH's.

This embodiment is therefore useful in carbon dioxide floods, or cyclic carbon dioxide injection, in which the efficiency has been reduced due to fingering of carbon dioxide through the reservoir. By forming a gel in the carbon dioxide break-through fingers, the efficiency of the operation is greatly improved.

This process will also apply to producing wells that are being used for carbon dioxide injection for purposes of reducing the viscosity of the oil. Absorption of the carbon dioxide by the oil causes the oil to swell and thereby lower its viscosity. This oil can then be produced more easily. Nonetheless, by first blocking those channels or fingers which cause a serious loss of carbon dioxide into the nonproducing strata, the efficiency of recovering oil by lowering its viscosity through carbon dioxide absorption can be greatly increased.

In still further embodiments of the above described gels, the water used to form the gel has a hardness of at least about 1000 ppm. In further embodiments the water has a hardness of at least about 3000 ppm, or 6000 ppm, or higher. In other further embodiments of the above described gels, the water used to form the gel has a total dissolved solids content of at least about 30,000 ppm. In a still further embodiment such water has a total dissolved solids content of at least about 80,000 ppm or higher.

In the embodiments of this invention the various aldehydes or aldehyde generating substances, which are operable for crosslinking, crosslink with the polyvinyl alcohol or polyvinyl alcohol copolymer principally through formation of acetals. Gels formed in this way are adaptable to the hardness of the water from which they are formed or exposed. These gels are also more stable at high temperatures than polyacrylamide based gels or gels made from biopolymers or polyvinyl alcohols gelled by other crosslinking agents such as borate.

Because of the adaptability and compatibility of these gels to water hardness or total dissolved solids content, these gels can be prepared using formation water, brackish water, sea water, brine or usually any other available source of water conveniently at hand as well as fresh water, i.e. $H_2O$. Because the largest ingredient used to formulate the above described gels is principally water, substantial economic advantage is provided by this invention which permits gels to be formed with the cheapest source of available water. However, the advantages of this invention are not limited merely to economic advantages because these gels also provide substantial technical advantages over other gels. For example, in many of their uses these gels are subjected to the infusion of severely contaminated water into the gelling mass prior to reaching its gelation point. Where such contaminated water infusion occurs in many other gelling fluids the gelation thereof is destroyed or so severely harmed that such other gels, if in fact they do gel, would be rendered ineffective for their intended use.

Due to their stability at elevated temperatures, the above described gels can also be formed and used in formations having an average formation or in-situ temperature of about 80° C. or higher, and in some embodiments where the average formation or in-situ temperature is 125° C. or higher.

The above described methods of forming a gel in situ in subterranean formations can be practiced using all of the gels provided by this invention.

The principles of this invention can also be used where the subterranean carbon dioxide-conveying and/or carbonic acid-conveying zone is under the subterranean hydrocarbon-producing formation; or where the subterranean carbon dioxide/carbonic acid-conveying zone surrounds the subterranean hydrocarbon-producing formation; or where at least part of the carbon dioxide/carbonic acid-conveying zone coincides with at least part of the subterranean hydrocarbon-producing formation.

In one embodiment of this invention which is directed to carbon dioxide flood operations, it frequently is desirable to treat the carbon dioxide injector wells with a polymer gel-forming solution to control the carbon dioxide flow profile. In this embodiment such treatment prevents nonproductive channeling of carbon dioxide at the injector well and/or controls and/or redirects carbon dioxide flow through regions of varying permeability. Since in this embodiment the polymer is injected as a relatively low viscosity aqueous phase it penetrates preferentially the region of highest permeability. Accordingly, after formation of the gel in high permeability regions, such regions are converted to low permeability to further retard carbon dioxide/carbonic acid flow thereby causing, upon further carbon dioxide injection, a carbon dioxide sweep of previously inaccessible areas in the formation which usually have relatively low permeability. By extending the carbon dioxide flow to such previously inaccessible regions, more hydrocarbons can be recovered than would be recovered in the absence of such polymer treatment.

The gels of this invention have improved resistance to heat and are stable in hard water. These characteristics make these gels particularly useful for many oil field applications. For oil field application, the stability and durability of the gels of this invention are an important advantage.

Accordingly, one objective of this invention is to provide a means of controlling carbon dioxide/carbonic acid flow in the nonproductive parts of the reservoir. The process is especially useful in formations having temperatures 80° C. or higher, or where the formation waters involved are saline or hard.

Another object of this invention is to provide a gel which can be formulated using hard water and water containing a high level of dissolved solids such as sea water and formation water encountered in deep offshore hydrocarbon fields.

Another object of this invention is to provide a gel which is stable at high temperatures and in particular more stable than other gels at such high temperatures.

DESCRIPTION OF THE PREFERRED EMBODIMENT

An oil well having an average formation or in-situ temperature of 65° C. (150° F.) or higher, and also having a high permeability to carbon dioxide, and in particular experiencing a loss of carbon dioxide to nonproductive parts of the reservoir, is treated by injecting a polyvinyl alcohol-glutaraldehyde-water mixture into the wellbore and from the wellbore into the reservoir. The mixture contains about 2.5% polyvinyl alcohol having an average molecular weight of 125,000 or higher, about 0.1% glutaraldehyde, and the remainder a brine having a total dissolved solids content of about 50,000 ppm and a hardness of about 5000 ppm. The polymer will undergo crosslinking and gel in situ in the formation in a period of time ranging between several hours to several days depending upon, in part, the average formation or in situ temperature. The following examples demonstrate how the gels of this invention can be tested and used for reducing the permeability of sandstone materials to carbon dioxide and/or carbonic acid.

EXAMPLE NO. 1

This example demonstrates how to determine the proper gel-forming composition for a reservoir experiencing carbon dioxide break through in a carbon dioxide flooding operation. Preferably a reservoir brine is used to prepare the gel-forming composition; however, if desired a synthetic brine which simulates the reservoir brine can be used. A useful formulation for a simulated brine is 4.5% NaCl, 0.4% $CaCl_2$, and 0.1% $MgCl_2$. The gel-forming composition is prepared by adding about 2.5% polyvinyl alcohol having an average molecular weight of about 125,000 to the brine and heating the mixture for 45 minutes at 95° C. to completely dissolve the polymer in the brine. The brine-polymer mixture can then be allowed to cool to room temperature. Just before injection, about 0.1% glutaraldehyde is added to the polyvinyl alcohol-brine mixture to produce the gel-forming composition.

A 60 centimeters (60 cm) long, 5 cm diameter high pressure core holder is packed with crushed reservoir rock to form a packed test core sample which is then saturated with brine and heated to 70° C. Brine is pumped through the core sample at the rate of about 30 cm per day or one foot per day (1 FPD) and the pressure drop across the core sample determined. Mineral oil having a viscosity of 10 centipoise (10 cp) at 25° C., is then pumped through the core sample at a rate of 30 cm per day until no more brine is displaced therefrom. More brine is then pumped through the core sample at 30 cm per day, until no more mineral oil is displaced therefrom and the pressure drop measured. Brine saturated with carbon dioxide is then pumped through the core sample, at 30 cm per day and the pressure drop determined. Thereafter the freshly mixed gel-forming composition is pumped into the core sample at a rate of 30 cm per day and the pressure drop monitored. The gel point occurs when the pressure drop radiply increases.

EXAMPLE NO. 2

A producing well, having an average formation temperature over 65° C., is prepared for treatment by running tubing down the wellbore to the formation depth. As a precaution, about 16 cubic meters (100 barrels) of formation brine is injected into the reservoir to displace any brine, which may have absorbed substantial amounts of carbon dioxide and could act as a crosslinking catalyzing substance, away from the wellbore. About 160 cubic meters of the above-described gel-forming composition is injected through the tubing into the formation, or alternatively the gel-forming composition is injected until the pumping pressure increases rapidly. This step is then followed by injecting additional formation brine into the reservoir to displace the gel-forming composition deeper into the formation. The well is shut in for about 48 hours and thereafter production resumed. It is expected that a before-treatment production of 10 cubic meters per day (10 CMPD) of oil and 50 CMPD of water will be improved about one month after treatment with the gel-forming composition to a production of about 20 CMPD of oil and 20 CMPD of water.

In all of the above illustrative examples it is to be understood that the gel-forming composition will not gel until it is in contact with a sorbed substance or brine which has sorbed substantial amounts of carbon dioxide. Thus effective amounts of other acidic catalyzing substances which can promote crosslinking of the polymer and aldehyde are to be excluded from the system.

Unless otherwise specified herein, all percents are by weight percents.

The gels, the methods of forming the gels, and the processes for retarding the flow of cabon dioxide and/or cabonic acid having some degree of flexibility. For example, if the environment in which the gels are to be used has a relatively high temperature, gel time can be slowed by using a smaller amount of the aldehyde or glutaraldehyde. Similarly, if the environmental temperature is relatively low, gelation can be speeded by the use of larger amounts of the second substance or aldehyde or by increasing the amount of sorbed carbon dioxide in the sorbed substance or brine. It is permissible to use the formation brine of the subterranean zone as the water part of the gel-forming composition since the gel will form even with hard water. Other variations of formulations, methods and processes will be apparent from this invention to those skilled in the art.

The foregoing disclosure and description of the present invention is illustrative and explanatory thereof and various changes in gel formation procedures and gel composition as well as the uses and applications of such gels to form them in situ in subterranean zones and to retard, block or redirect carbon dioxide flow in subterranean zones may be made within the scope of the appending claims without departing from the spirit of the invention. For example, many gel formulations can be produced and many methods for forming such gels in situ in subterranean formations will be apparent to one skilled in the art from this invention. For example, any number of sequential injection steps of the gel-forming compositions can be made. Further, the necessary concentrations, amounts and sequence of injection of the gel-forming compositions can be tailored to suit the particular well or subterranean formation being treated.

What is claimed is:

1. A process for retarding the flow of carbon dioxide in carbon dioxide break-through fingers in a subterranean formation, said process comprising:
   (a) introducing a gas selected from the group consisting of carbon dioxide and gases containing carbon dioxide into a subterranean deposit containing carbon dioxide break-through fingers;
   (b) after said carbon dioxide break-through fingers have sorbed a predetermined amount of said gas, stopping the flow of said gas into said subterranean formation;
   (c) after stopping the flow of said gas into said subterranean formation, introducing an effective amount of a gel-forming composition into said subterranean formation and into said carbon dioxide break-through fingers, said gel-forming composition being operable, when contacting carbon dioxide break-through fingers containing brine which has absorbed substantial amounts of carbon dioxide, to form a gel in said fingers which is operable for retarding the flow of said gas in said fingers, said gel-forming composition comprising
   i. an aqueous solution comprising a first substance selected from the group consisting of polyvinyl alcohols, polyvinyl alcohol copolymers, and mixtures thereof, and
   ii. an amount of a second substance selected from the group consisting of aldehydes, aldehyde generating substances, acetals, acetal generating substances, and mixtures thereof capable of crosslinking with the first substance through the formation of acetal crosslinkages, which is operable for effecting gelation of said gel-forming composition in said fingers after contacting said gel-forming composition with a brine which has absorbed substantial amounts of carbon dioxide, but which is inoperable for effecting gelation of said gel-forming composition in flow passages containing a brine which has not absorbed substantial amounts of carbon dioxide and which is also free of effective amounts of other crosslinking catalyzing substances, and
   wherein said first substance is from about 0.5 to about 5% of the weight of said gel-forming composition, and wherein said second substance is from about 0.01 to about 2% of the weight of said gel-forming composition;
   (d) allowing said gel-forming composition to contact said brine containing substantial amounts of absorbed cabon dioxide; and
   (e) allowing a gel to form in said fingers of said subterranean formation which is effective for retarding the flow of said carbon dioxide-containing substance in said fingers.

2. The process of claim 1, wherein said gel-forming composition is at least about 97 weight percent water and at least about 65 weight percent $H_2O$.

3. The process of claim 2, wherein said water is a brine.

4. The process of claim 1, wherein said first substance is from about 1.5 to about 5% of the weight of said gel-forming composition.

* * * * *